J. BELLAY.
AUTOMOBILE JACK.
APPLICATION FILED DEC. 27, 1920.
1,387,581.
Patented Aug. 16, 1921.
2 SHEETS—SHEET 1.
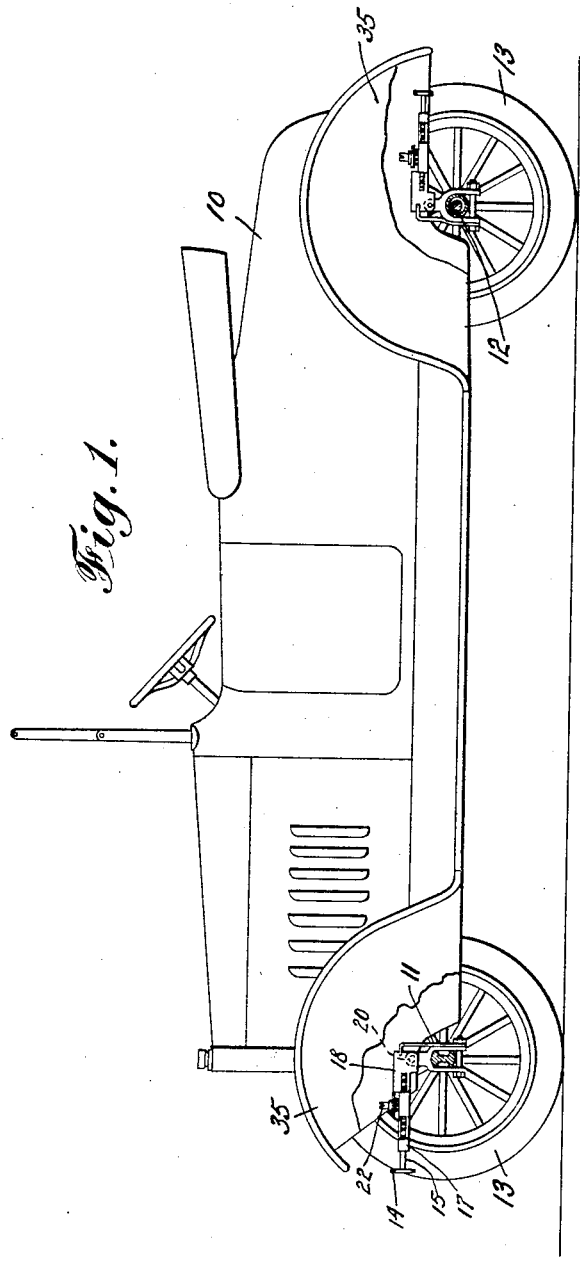
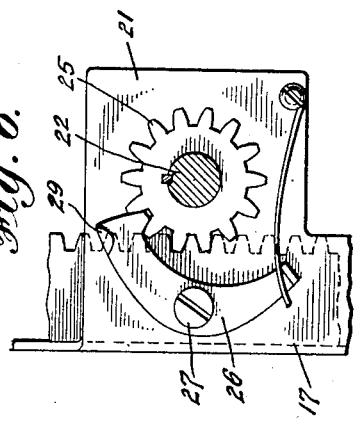
INVENTOR
J. Bellay
BY
Sigmund Herzog
ATTORNEYS J. BELLAY.
AUTOMOBILE JACK.
APPLICATION FILED DEC. 27, 1920.
1,387,581.
Patented Aug. 16, 1921.
2 SHEETS—SHEET 2.
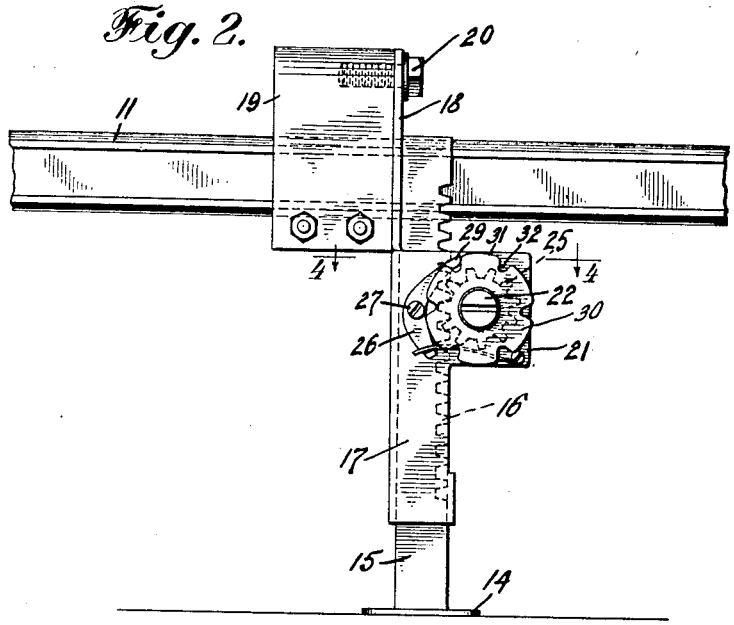
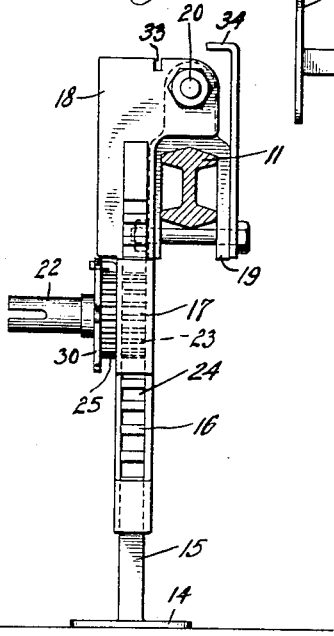
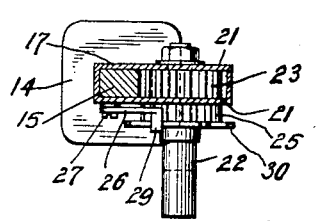
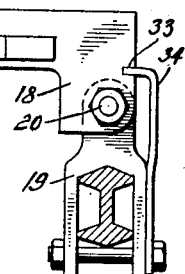

UNITED STATES PATENT OFFICE.

JOHN BELLAY, OF BELLEVILLE, NEW JERSEY.

AUTOMOBILE-JACK.

1,387,581.   Specification of Letters Patent.   Patented Aug. 16, 1921.

Application filed December 27, 1920. Serial No. 433,435.

*To all whom it may concern:*

Be it known that I, JOHN BELLAY, a citizen of the United States, and resident of the city of Belleville, in the county of Essex and State of New Jersey, have invented certain new and useful Automobile-Jacks, of which the following is a specification.

The present invention relates to improvements in lifting jacks, and more particularly to devices of this type which are especially adapted for use in connection with automobiles.

The main object of the invention is to provide a jack of the type mentioned which is designed to form a permanent automobile attachment, capable of being easily swung both into operative and inoperative positions, the attachment being held, when not in use, in raised position concealed from view.

Another object of the invention is to produce an automobile jack of the type mentioned, which is simple in construction, efficient in operation and capable of manufacture on a commercial scale, or in other words one which is not so difficult to make as to be beyond the reasonable cost of such a contrivance.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1 is a side elevation, partly in section, of an automobile provided with the attachment, forming the subject matter of the present application for Letters Patent; Fig. 2 is a front elevation of the improved automobile jack in its operative position; Fig. 3 is a side elevation thereof; Fig. 4 is a section taken on line 4—4 of Fig. 2; Fig. 5 is a front elevation of the jack in its raised, inoperative position; and Fig. 6 is a side elevation of a detail of construction, certain elements being removed to more clearly show the construction.

In the drawings, the numeral 10 indicates an automobile of any suitable type, including a front axle 11 and a rear axle 12, each connected with wheels 13. On each of the axles is mounted adjacent each wheel a lifting jack, all of which are alike in construction, so that herein only one of the same need be described.

The jack comprises a base 14, from which rises a standard 15, having rack-teeth 16 thereon. This standard is made of quadrangular cross-section, as clearly appears from Fig. 4 of the drawings, and is slidably arranged in a tubular frame 17, into which the said standard snugly fits. The frame 17 is provided at its upper end with a lug 18, abutting against a clip 19, the latter being fixed to an axle of the automobile, connection being made between the said lug and the said clip by a pivot pin 20, in the form of a screw. This connection permits the frame 17 and the elements carried thereby to be swung around the said clip, in a manner hereinafter to be described.

The frame 17 is provided with two outwardly projecting spaced parallel ears 21, in which is rotatably mounted a spindle 22, to the latter being fixed in any suitable manner a pinion 23, located between said ears and extending through a slot 24 in the frame 17 into mesh with the rack-teeth 16. To the spindle 22 is furthermore attached a pinion 25, which is disposed outside of the frame 17 and has a number of teeth corresponding to that of the teeth of the pinion 23, the teeth on the two pinions being, preferably, in alinement. With the teeth of the pinion 25 meshes a spring-pressed pawl 26, pivoted at 27 to the frame 17. This pawl is provided with an outwardly projecting lug 29, in engagement with a star-wheel 30, which is fixed in any suitable manner to the spindle 22. The teeth of the star-wheel are so shaped that, when the latter is rotated in either direction, the pawl is shifted around its pivot and disengaged from the teeth of the pinion 25. The pawl is kept disengaged from the said pinion, in the rotation of the star-wheel, while the lug 29 rides over the arc-shaped portions 31 of the said star-wheel, and is again engaged with the said pinion when the said projection drops into a recess 32 in the star-wheel. In this manner, an intermittent engagement and disengagement between the pawl and the pinion 25 takes place, for a purpose hereinafter to be described.

The lug 18 is provided with a notch 33, into which fits a spring catch 34, mounted upon the clip 19, to hold the jack in its raised inoperative position.

The operation of this device is as follows: The jacks on the automobile are, when not needed, held in horizontal positions, as clearly shown in Fig. 1 of the drawings, the spring catches being engaged with the notches 33 in the lugs 18 thereof. When in these positions, the jacks extend in parallel relation to the longitudinal axis of the automobile and are concealed from view by the mud-guards 35 of the automobile. The jacks are mounted as close as possible to the wheels and any one of the same may be brought into operative position by shifting the same around the respective pivot pin 20 into vertical position. In order to raise a wheel adjacent to which a jack is mounted, the respective jack is brought into vertical position and the spindle 22 thereof engaged by a suitable handle and rotated in the proper direction. By rotating the spindle, the pinion 23, in mesh with the rack teeth of the standard 15, causes the frame 17 to rise in the well known manner. The rising movement of the jack frame 17 is intermittent for the reason that the pawl 26 is intermittently disengaged from the pinion 25. A backward movement of the frame is prevented by the intermittent engagement of the said pawl with the pinion coöperating therewith. In order to lower the car, the pinion 23 is moved in the opposite direction. After the car has been brought to its normal position, the jack is swung around its pivot into horizontal position, in which the spring catch is engaged with the notch 33 in the lug 18 thereof.

Inasmuch as the car is provided with a plurality of jacks, in the present case four, the automobile is adapted to be wholly lifted from the ground, which is desirable if it is to be stored for the winter or when it is intended to keep the same idle for a considerable time.

It is obvious that, while herein the jacks have been described as being mounted upon the axles of the automobile, they may be attached to other parts of the automobile frame without departing from the invention.

Attention is also called to the fact that, while herein a specific jack construction has been described, others may just as well be employed without departing from the invention, which lies mainly in the combination of an automobile frame with a jack, mounted thereon in a manner to permit the same to be shifted from an inoperative position into substantially vertical, that is operative position.

What I claim is:—

A lifting jack comprising a tubular frame, a standard slidably extending therethrough, a base on said standard, said standard being provided with rack-teeth, a spindle rotatably mounted on said frame, a pinion fixed to said spindle meshing with said rack-teeth, a second pinion rigidly fastened to said spindle, a spring-pressed pawl pivoted to said frame in engagement with said second mentioned pinion, said two pinions having the same number of teeth, a star-wheel fixed to said spindle, and a lug on said pawl in engagement with said star-wheel, said star-wheel in its rotation intermittently disengaging said pawl from the pinion coöperating therewith.

Signed at New York, in the county of New York and State of New York, this 22nd day of October, A. D. 1920.

JOHN BELLAY.